(12) United States Patent
Suh

(10) Patent No.: US 7,127,662 B2
(45) Date of Patent: Oct. 24, 2006

(54) METHOD FOR RECORDING ADDRESS INFORMATION ON OPTICAL RECORDING MEDIUM, OPTICAL RECORDING MEDIUM INCLUDING ADDRESS INFORMATION RECORDED THEREON BY THE SAME METHOD, AND METHOD FOR DETECTING ADDRESS INFORMATION RECORDED ON THE SAME OPTICAL RECORDING MEDIUM

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 485 days.

(21) Appl. No.: 10/288,488

(22) Filed: Nov. 6, 2002

(65) Prior Publication Data

US 2003/0093749 A1    May 15, 2003

(30) Foreign Application Priority Data

Nov. 6, 2001    (KR) .............................. 2001-69003

(51) Int. Cl.
*G11B 7/013* (2006.01)
(52) U.S. Cl. ....................................... 714/775; 369/56
(58) Field of Classification Search ................ 369/56; 714/775, 769
See application file for complete search history.

(56) References Cited

U.S. PATENT DOCUMENTS 6,091,700 A * 7/2000 Kobayashi ............... 369/275.4
6,130,866 A * 10/2000 Shigenobu et al. ....... 369/47.18
6,175,943 B1 * 1/2001 Yim ........................... 714/769
6,198,710 B1 * 3/2001 Hori et al. ................ 369/59.24
6,201,778 B1 * 3/2001 Sensyu ..................... 369/53.34
6,266,318 B1 * 7/2001 Honda et al. ............. 369/275.3
6,314,542 B1 * 11/2001 Nagai et al. ................ 714/755
6,434,091 B1 * 8/2002 Kuribayashi ............. 369/44.13
6,560,175 B1 * 5/2003 Maeda et al. ............. 369/47.28
6,560,181 B1 * 5/2003 Takahashi ................ 369/53.35
6,721,251 B1 * 4/2004 Kojima et al. ........... 369/47.54
6,754,152 B1 * 6/2004 Kando et al. ............. 369/47.54
6,813,230 B1 * 11/2004 Ko et al. .................... 369/47.1

* cited by examiner

*Primary Examiner*—Stephen M. Baker
(74) *Attorney, Agent, or Firm*—Birch, Stewart, Kolasch, and Birch, LLP

(57) ABSTRACT

A method for recording address information on an optical recording medium, an optical recording medium including address information recorded thereon by the same method, and a method for detecting the address information recorded on the optical recording medium. Physical address information of the recordable optical recording medium is encoded for insertion as a synchronous code in a head of each sector in an error correction code block unit including a predetermined number of sectors. After the encoded physical address information is modulated into a wobble signal, a wobble-shaped groove is formed on the optical recording medium, using the wobble signal. This configuration allows sector-by-sector addressing operation without reducing the data recording capacity of the optical recording medium for recording real data.

3 Claims, 5 Drawing Sheets

RELATED ART

METHOD FOR RECORDING ADDRESS INFORMATION ON OPTICAL RECORDING MEDIUM, OPTICAL RECORDING MEDIUM INCLUDING ADDRESS INFORMATION RECORDED THEREON BY THE SAME METHOD, AND METHOD FOR DETECTING ADDRESS INFORMATION RECORDED ON THE SAME OPTICAL RECORDING MEDIUM

BACKGROUND OF THE INVENTION

1. Field of the Invention

The present invention relates to a method for recording address information on an optical recording medium, an optical recording medium including address information recorded thereon by the same method, and a method for detecting the address information recorded on the optical recording medium.

2. Description of the Related Art

A general recordable optical disc (optical recording medium) such as a DVD-RAM, a DVD-RW (Re-Writable), or a high-density optical recording medium has a recess formed along a track having a spiral or concentric-circle form. The recessed portion is called a groove, and the remaining portion is called a land. There are two methods of recording data on the optical disc. One method is to record data on one of the groove and the land, and the other is to record data on both of them. When the groove is formed, a specific variation is formed in the wall of the groove. During the recording or reproducing operations, the specific variation produces a signal having a specific frequency. Thus, the specific variation is used as auxiliary clock means. The specific variation is called a wobble, and the signal having the specific frequency is called a wobble signal.

Meanwhile, physical address information should be formed in advance on the optical disc. To this end, a CAPA (Complementary Allocated Pit Addressing) method is used for the DVD-RAM, and a land pre-pit addressing method is used for the DVD-RW.

The Land pre-pit addressing method used in the DVD-RW has a problem that the address decoding performance may be lowered depending on the state of the disc and recording/reproducing conditions such as a tilt of the disc.

On the other hand, in the CAPA method, sector-by-sector address information is formed and recorded in the pre-pit form at the head of each of the sectors for the physical addressing operation. The CAPA method has an advantage in that a sector-by-sector addressing operation can be performed, but has a problem that, because the address information is recorded on a sector basis on the data recording region on which real data is to be recorded, the data recording capacity for recording real data is reduced.

In order to overcome the problem of reduction in the data recording capacity, a method for recording physical address on the optical recording medium using a wobble signal carrying the physical address has been proposed. This method is called a wobble addressing method.

As an example of such a wobble addressing method, there is a BPSK (Binary Pulse Shift Keying) wobble addressing method that has been adopted in the high-density optical recording medium.

FIG. 1 is a view showing the format of one error correction block of physical address information that is formed and recorded in the wobble form on the high-density optical recording medium by the BPSK wobble addressing method. As shown in FIG. 1, in the high-density optical recording medium, four addressing operations are performed for one ECC (Error Correction Code) block having a predetermined recording size (e.g., an ECC of 16-sector recording size). That is, the error correction code block of 16-sector recording size is divided into four different ADIP (Address In Pre-Groove) words (ADIP Word #1–#4) of 4-sector recording size, and the addressing operation is performed for each ADIP word. One ADIP word includes 52 ADIP units, and one ADIP unit includes 93 wobble units. An ADIP word synchronous code (ADIP Sync) is expressed at the first ADIP unit of each ADIP word, and physical address information of the error correction code block is expressed by 51 bits at the remaining 51 ADIP units. The ADIP word synchronous code indicates that its subsequent 51 ADIP units are physical address data of the error correction code block, and each ADIP word synchronous code has one kind of predetermined code value.

Accordingly, the BPSK wobble addressing method currently used in the high-density optical recording medium has an advantage in that, because there is no need to form and record address information in a separate pre-pit, differently from the CAPA method, the data recording capacity for recording real data can be prevented from being reduced.

However, in the BPSK wobble addressing method, because the ADIP word synchronous code is formed and recorded on a 4-sector basis, it is possible to perform random access, or data overwrite recording, etc., on an error correction block basis, but it is impossible to perform addressing operation on a sector basis.

SUMMARY OF THE INVENTION

Therefore, the present invention has been made in view of the above problems, and it is an object of the present invention to provide a method for recording address information on an optical recording medium, an optical recording medium including address information recorded thereon by the same method, and a method for detecting the address information recorded on the same optical recording medium, which allows addressing operation on a sector basis, without reducing the data recording capacity of the optical recording medium for recording real data.

In accordance with one aspect of the present invention, the above and other objects can be accomplished by the provision of a method for recording address information on a writable optical recording medium, the method comprising the steps of:

encoding physical address information of the writable optical recording medium as a synchronous code for insertion in a head of each sector in an error correction code block unit including a predetermined number of sectors; and modulating the encoded physical address information into a wobble signal and recording the wobble signal on the optical recording medium.

Preferably, the error correction code block includes N sectors, and the synchronous codes positioned at the heads of the N sectors have code values different from each other. Alternatively, the error correction code block includes N sectors, and the synchronous code of its first sector has a code value different from synchronous codes of the remaining (N−1) sectors.

In accordance with another aspect of the present invention, there is provided an optical recording medium including a wobble-shaped recording track that is formed thereon based on a wobble signal, said wobble signal being obtained by modulating physical address information, said physical address information being encoded for insertion as a synchronous code in a head of each sector in an error correction code block unit including a predetermined number of sectors.

In accordance with still another aspect of the present invention, there is provided a method for detecting address information recorded on an optical recording medium, the method comprising:

a first step of detecting synchronous codes from the wobble signal read from the optical recording medium including a wobble-shaped recording track that is formed thereon based on a wobble signal obtained by modulation of physical address information encoded for insertion as a synchronous code in a head of each sector in an error correction code block unit including a predetermined number of sectors, so as to detect sector-by-sector address information of the error correction code block; a second step of detecting address information of the error correction code block, from remaining portions of the wobble signal other than the synchronous codes; and a third step of obtaining a physical address of the optical recording medium by combining the detected sector-by-sector address information with the detected address information of the error correction code block.

In accordance with yet another aspect of the present invention, there is provided a device for detecting address information recorded on an optical recording medium, the device comprising a combination of elements for:

detecting synchronous codes from the wobble signal read from the optical recording medium including a wobble-shaped recording track that is formed thereon based on a wobble signal obtained by modulation of physical address information encoded for insertion as a synchronous code in a head of each sector in an error correction code block unit including a predetermined number of sectors, so as to detect sector-by-sector address information of the error correction code block;

detecting sector-by-sector address information of the optical recording medium by decoding the detected synchronous code;

detecting address information of the error correction code block by decoding remaining portions of the wobble signal other than the synchronous code; and outputting the physical address of the optical recording medium by combining the detected sector-by-sector address information with the detected address information of the error correction code block.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
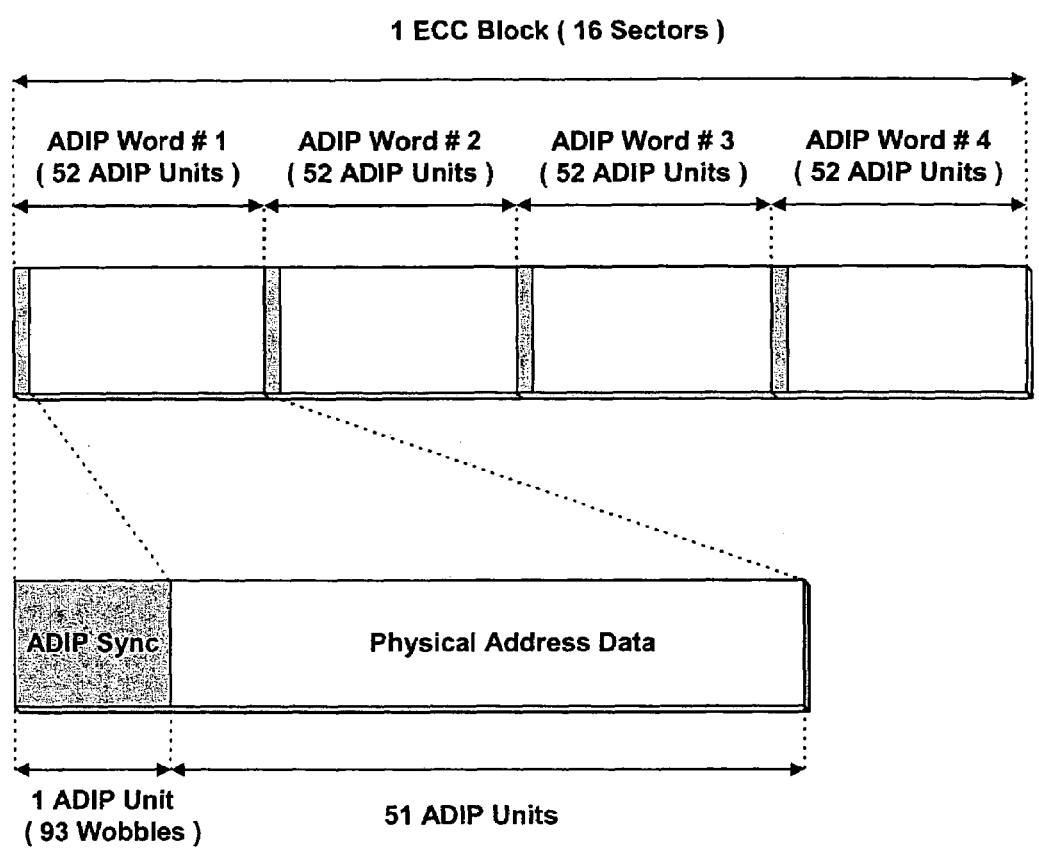
FIG. 1 is a view showing the format of one error correction block of physical address information that is recorded in the wobble form on an optical recording medium by a BPSK wobble addressing method.

Referring to the drawings, a detailed description will now be given of a method for recording address information on an optical recording medium, an optical recording medium on which address information is recorded by the same method, and a method for detecting the address information recorded on the same optical recording medium, according to preferred embodiments of the present invention.

Figure 2:
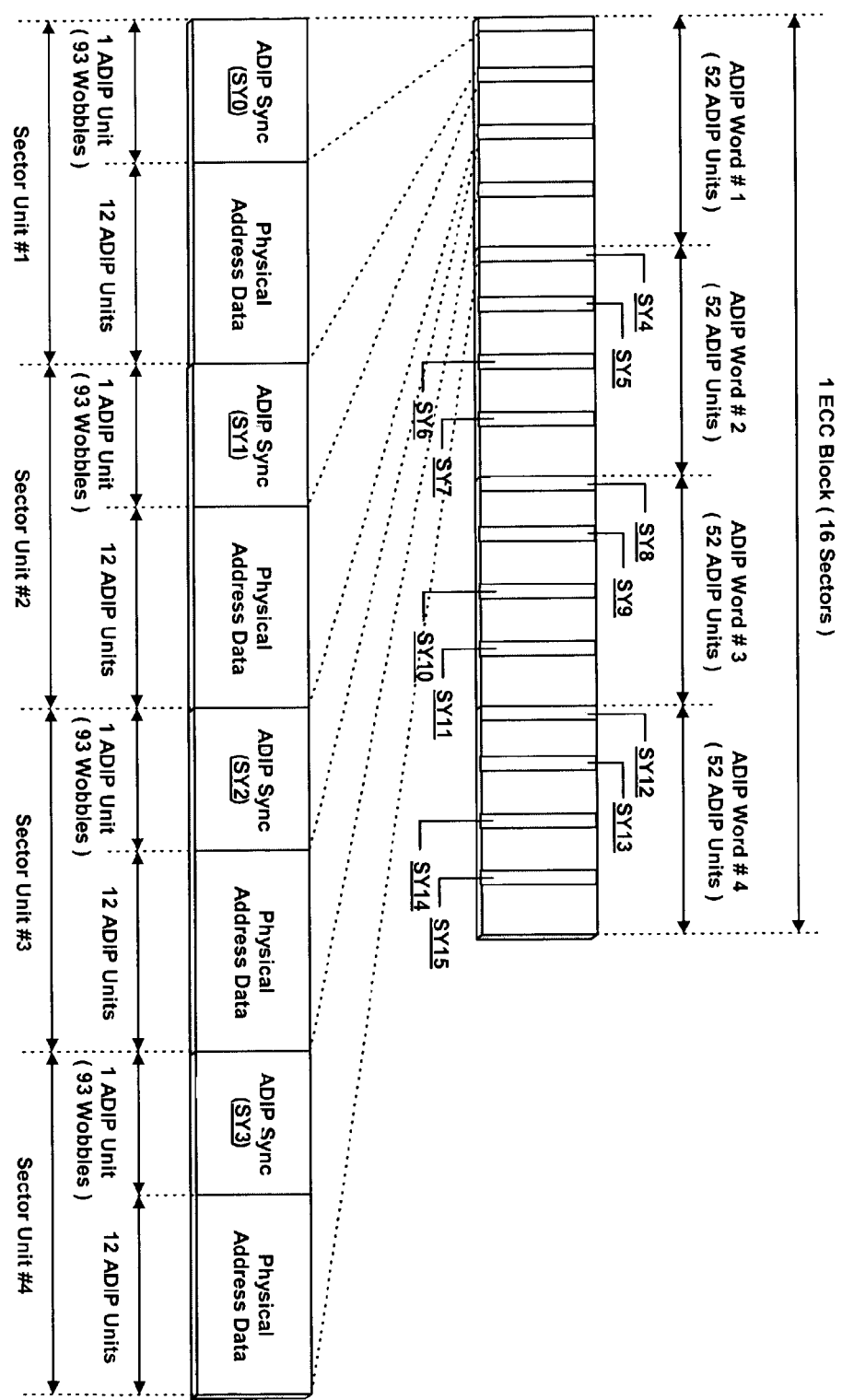
FIG. 2 is a view showing the format of one error correction block of physical address information that is recorded in the wobble form on an optical recording medium in a method for recording address information on the optical recording medium, according to one embodiment of the present invention.

First, as shown FIG. 2, in a recordable optical disc as an optical recording medium according to the present invention, a synchronous code is inserted in the head of each sector in an error correction code block of predetermined recording size (for example, 16-sector recording size), and physical address information of the error correction code block is inserted in the remaining portion other than the head. After the physical address information of the optical disc is encoded on an ECC block basis in such a manner, the encoded data is modulated to a wobble signal. Using this wobble signal, a wobble-shaped groove is formed on the optical disc, consequently achieving the recording of the physical address information on the optical disc.

FIG. 2 is a view showing the format of one error correction block of physical address information, in the case where four addressing operations are performed for the one error correction code block of 16-sector recording size. The present invention is not limited to this case of four addressing operations, but can also be applied to the cases of two or three addressing operations.

In the embodiment of FIG. 2, the error correction code block of 16-sector recording size is divided into four different ADIP (Address In Pre-Groove) words (ADIP Word #1–#4) of 4-sector recording size, and addressing operation is performed for each word. Here, one ADIP word includes 52 ADIP units, and one ADIP unit includes 93 wobble units. Each ADIP word is divided into four different sector units (Sector Unit #1–#4). Each sector unit corresponds to the size of a physical sector, and includes 13 ADIP units. An ADIP synchronous code (SY0, SY1, SY2 or SY3) is expressed at the first ADIP unit of each sector unit, and physical address information of the error correction code block is expressed at the remaining 48 ADIP units.

Here, one error correction code block includes 16 sector units. An ADIP synchronous code (SY0, SY1, SY2 ... or SY15) is expressed at the first ADIP unit of each sector unit. The ADIP synchronous codes (SY0~SY15) have different code values. The ADIP synchronous code SY0 indicates the beginning of one error correction code block and the beginning of the first sector of the error correction code block, and simultaneously indicates that its subsequent 12 ADIP units are physical address information of the error correction code block. In addition, each of the ADIP synchronous codes (SY1~SY15) indicates the beginning of each of the $2^{nd}$~$16^{th}$ sectors of the error correction code block, and simultaneously indicates that its subsequent 12 ADIP units are physical address information of the error correction code block.

According to the present embodiment, a synchronous code having its unique code value is inserted in the head of each of the physical sectors that constitute an error correction code block, and physical address information of the error correction code block is inserted in the remaining portions subsequent to this synchronous code. After the physical address information of the optical disc is encoded on an ECC block basis in such a manner, the encoded data is modulated to a wobble signal. Using this wobble signal, a wobble-shaped groove is formed on the optical disc.

As mentioned above, the physical address information of the optical disc consists of physical address information of an error correction code block, together with the beginning position information of each sector (that is, ADIP synchronous code), and is recorded in the wobble form on the groove of the optical disc. Accordingly, during the reproducing/recording operations of the optical disc, the physical address information recorded in the wobble form is decoded into the ADIP synchronous code type and the physical address information of the error correction block, thereby allowing easy addressing operation of the physical sector.

A detailed description will now be given of a device and method for detecting the address information of the optical recording medium from the wobble signal that is read from the optical disc during reproducing and recording operations of an optical disc as the optical recording medium on which physical address information is recorded as mentioned above.

Figure 3:
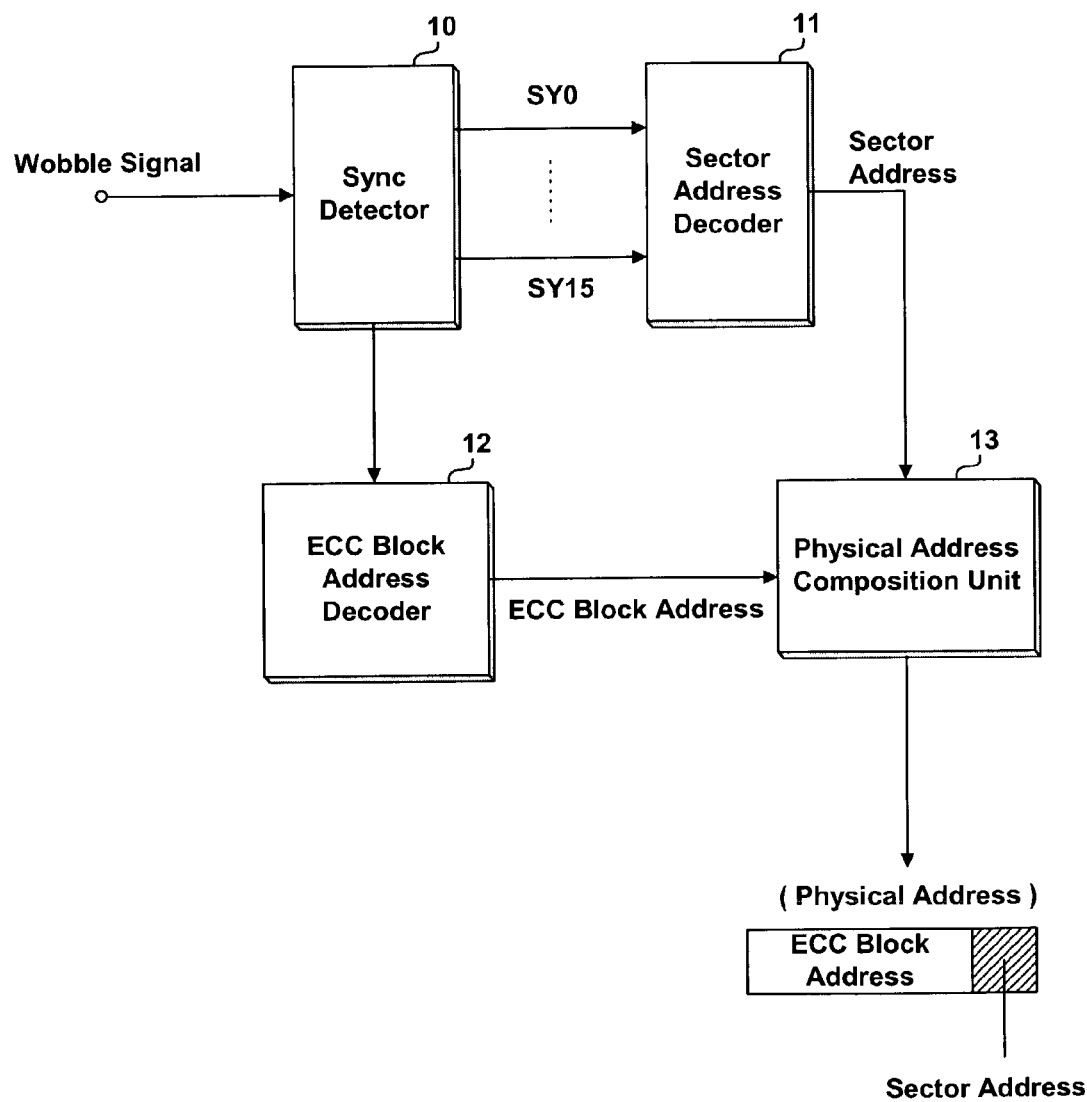
FIG. 3 is a view showing the configuration of a detecting device for implementing a method for detecting the address information recorded on the optical recording medium in the format shown in FIG. 2.

FIG. 3 is a view schematically showing the configuration of a device for detecting the address information of the optical recording medium according to one embodiment of the present invention. The address detecting device includes a synchronous code detector 10, a sector address decoder 11, an ECC block address decoder 12, and a physical address composition unit 13.

The synchronous code detector 10 detects each of 16 different synchronous codes (SY0~SY15) indicating the head of each sector, from the wobble signal read from the recordable optical disc (for example, the optical disc on which the different synchronous codes are formed and recorded in the head of each sector constituting the physical address in the error correction code block, as mentioned above referring to FIG. 2).

The sector address decoder 11 decodes each of the detected 16 different synchronous codes, thereby detecting address information of the recordable optical disc on a sector basis.

The ECC block address decoder 12 receives the remaining portion of the wobble signal other than the synchronous code from the synchronous code detector 10, and decodes and outputs address information of the error correction code block.

The physical address composition unit 13 combines address information for each sector decoded by the sector address decoder 11 with the ECC block address information decoded by the ECC block address decoder 12, and outputs the combined information (ECC Block Address+Sector Address) as the physical address information of the recordable optical disc.

Accordingly, such a configuration allows sector-by-sector address differentiation without recording address information in a separate pre-pit, differently from the CAPA method currently used in the DVD-RAM, so that it is possible to prevent the reduction of the data recording capacity for recording real data, and random access or data overwrite recording can be performed on a sector basis.

A detailed description will now be given of a method for recording address information on an optical recording medium according to another embodiment of the present invention.

Figure 4:
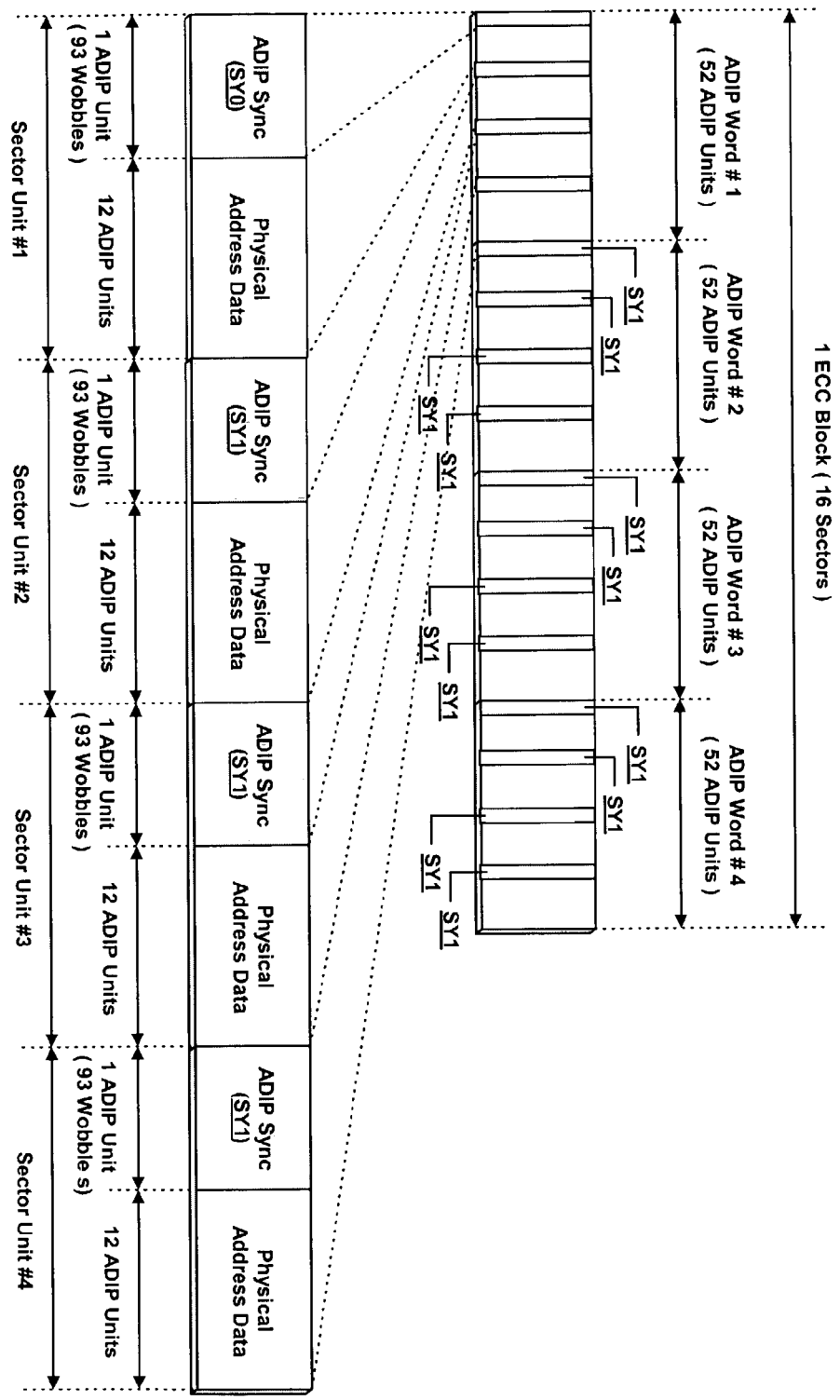
FIG. 4 is a view showing the format of one error correction block on physical address information that is recorded in the wobble form on an optical recording medium in a method for recording address information on the optical recording medium, according to another embodiment of the present invention.

FIG. 4 is a view showing the format of one error correction block of physical address information, which is adopted in another embodiment of the present invention. This format differs from that of FIG. 2, that an ADIP synchronous code SY0 is recorded in the head of the first sector and an ADIP synchronous code SY1 is recorded in the head of each of the remaining $2^{nd}$ to $16^{th}$ sectors in an error correction code block. Each of the ADIP synchronous codes SY1 and SY2 have different code values. The other portions of the format of FIG. 4 are substantially the same as that of FIG. 2.

In detail, the error correction code block of 16-sector recording size is divided into four different ADIP (Address In Pre-Groove) words (ADIP Word #1–#4) of 4-sector recording size, and four addressing operations are performed. One ADIP word composed of 52 ADIP units is divided into four sector units, and each sector unit corresponds to the size of a physical sector. Each sector unit includes 13 ADIP units. An ADIP synchronous code SY0 or SY1 is recorded in the first ADIP unit of each sector unit, and each ADIP unit is composed of 93 wobbles. In addition, as mentioned above, a different code value is assigned to the ADIP synchronous code SY0 recorded in the head of the first sector in one error correction code block, and the ADIP synchronous code SY1 recorded in the head of each of the remaining $2^{nd}$ to $16^{th}$ sectors in the error correction code block, while a code value different from the code value of SY0 is assigned to the ADIP synchronous codes SY1 recorded in the head of each of the remaining $2^{nd}$ to $16^{th}$ sectors.

The ADIP synchronous code SY0 indicates the beginning of one error correction code block and the beginning of the first sector of the error correction code block, and simultaneously indicates that its subsequent 12 ADIP units are physical address information of the error correction code block. Each of the ADIP synchronous codes SY1 indicates the beginning of one of the $2^{nd}$~$16^{th}$ sectors of the error correction code block, and simultaneously indicates that its subsequent 12 ADIP units are physical address information of the error correction code block.

Referring to the format shown in FIG. 4, a detailed description will now be given of a device and method for detecting the address information of the optical recording medium from the wobble signal that is read from the optical disc during reproducing and recording operations of the optical disc as the optical recording medium on which physical address information is recorded.

Figure 5:
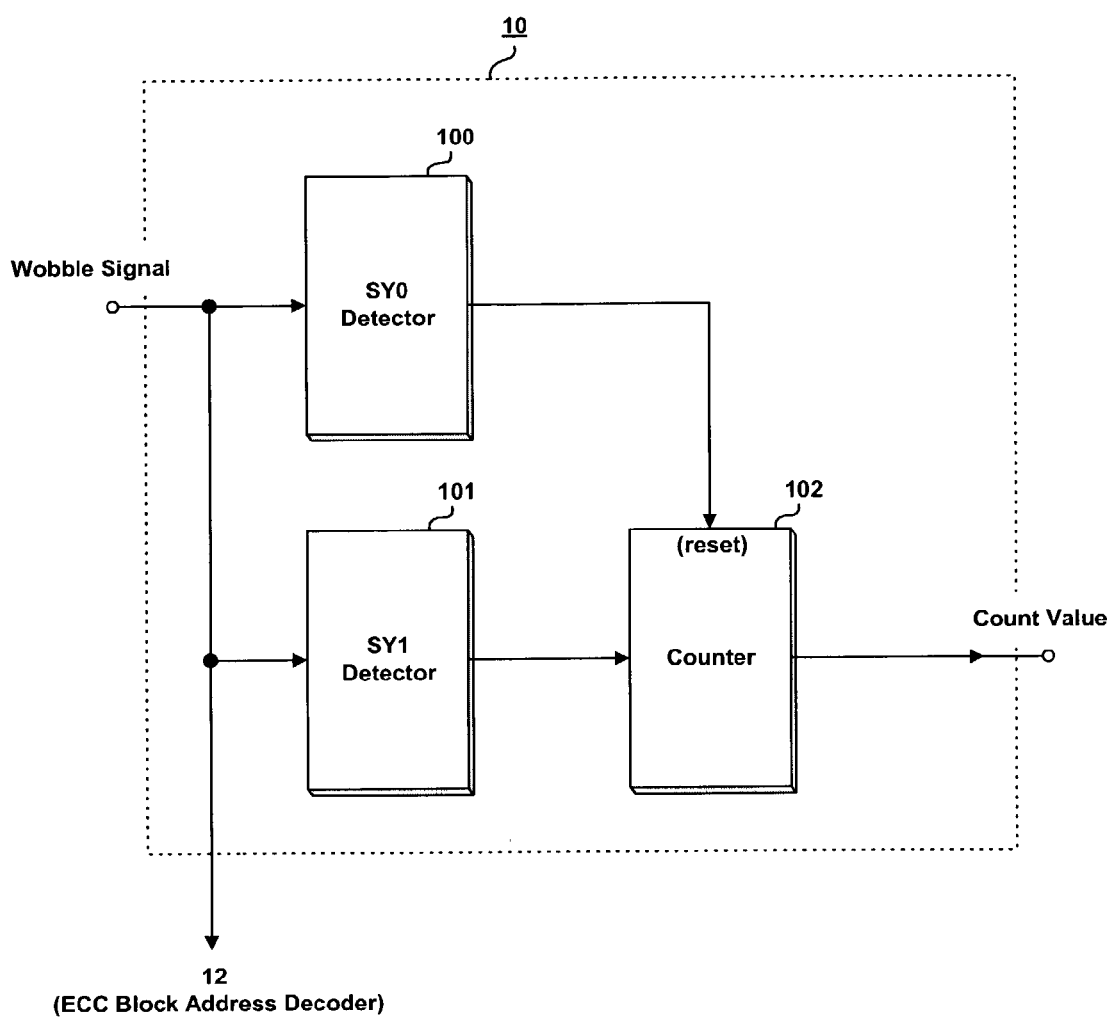
FIG. 5 is a view showing the configuration of the main part of a detecting device for implementing a method for detecting the address information recorded on the optical recording medium in the format shown in FIG. 4.

FIG. 5 is a view showing only a synchronous decoder of the configuration of the device for detecting address information of the optical recording medium according to another embodiment of the present invention. The remaining parts of this device other than the synchronous decoder are the same as those shown in FIG. 3.

The synchronous signal detector 10 according to this embodiment includes first and second synchronous detecting portions 100 and 101, and a counter 102. The first synchronous detecting portion 100 detects the first synchronous code SY0 recorded in the head of the first sector of an error correction code block. The second synchronous detecting portion 101 detects the second synchronous codes SY2 recorded in the head of the $2^{nd}$ to $16^{th}$ sectors of the error correction code block. The counter 102 counts the second synchronous codes SY1 detected by the second synchronous code detector 101, on the basis of the first synchronous code SY0 detected by the synchronous code detector 100, to output count values differentiating the second synchronous codes SY1 on a sector basis.

In the synchronous signal detector 10 according to the present invention, when the first synchronous code SY0 is detected by the first synchronous code detecting portion 100, the detection pulse is input to a reset terminal of the counter 102, and, in response to this input, the counter 102 outputs a count value "0". This count value is input to the sector address decoder 11 shown in FIG. 3 to be decoded to a sector address. Thereafter, each time one second synchronous code SY1 is detected by the second synchronous detector 101, a pulse is input to the counter 102. The counter 102 counts up when the pulse is input, and the output count value of the counter 102 is input to the sector address decoder 11 shown in FIG. 3 to be decoded.

In addition, the ECC block address decoder 12 decodes the remaining portion of the wobble signal other than the synchronous codes SY0 and SY1 into address information of the error correction code block.

Further, the physical address composition unit 13 combines address information for each sector decoded by the sector address decoder 11 with ECC block address information decoded by the ECC block address decoder 12, and outputs the combined information (ECC Block Address+Sector Address) as the physical address information of the sector on the recordable optical disc.

As apparent from the above description, the present invention has advantages in that sector-by-sector addressing operation is possible without reducing the data recording capacity of the optical recording medium for recording real data thereon, and random access or data overwrite recording can be performed on a sector basis.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for detecting address information recorded on an optical recording medium, the method comprising:

detecting synchronous codes from the wobble signal read from the optical recording medium including a wobble-shaped recording track that is formed thereon based on a wobble signal obtained by modulation of physical address information encoded for insertion as a synchronous code in a head of each sector in an error correction code block unit including a predetermined number of sectors, so as to detect sector-by-sector address information of the error correction code block wherein the error correction code block includes N sectors and the synchronous code of the first sector has a code value different from the synchronous codes of the remaining (N−1) sectors, wherein a synchronous code indicating the first sector in the error correction code block and (N−1) of the same synchronous codes, respectively, indicating the remaining sectors other than the first sector are detected from the wobble signal read from the optical recording medium, and the detected codes are counted to detect sector-by-sector address information;

detecting address information of the error correction code block, from remaining portions of the wobble signal other than the synchronous codes; and obtaining physical addresses of the optical recording medium by combining the detected sector-by-sector address information with the detected address information of the error correction code block.

2. A device for detecting address information recorded on an optical recording medium, the device comprising:

a synchronous signal detecting unit detecting synchronous codes from the wobble signal read from the optical recording medium including a wobble-shaped recording track that is formed thereon based on a wobble signal obtained by modulation of physical address information encoded for insertion as a synchronous code in a head of each sector in an error correction code block unit including a predetermined number of sectors, so as to detect sector-by-sector address information of the error correction code block wherein the error correction code block includes N sectors, and the synchronous code of its first sector has a code value different from synchronous codes of the remaining (N−1) sectors, wherein the synchronous signal detecting means detects a synchronous code indicating the first sector in the error correction code block and (N−1) of the same synchronous codes respectively indicating the remaining sectors other than the first sector, from the wobble signal read from the optical recording medium, and outputs, as a synchronous code, a count value obtained by counting the (N−1) synchronous codes on the basis of the detected synchronous code indicating the head of the first sector and the sector address decodes the count value to output sector-by-sector address information;

an address information detecting unit detecting sector-by-sector address information of the optical recording medium by decoding the detected synchronous code and detecting address information of the error correction code block by decoding remaining portions of the wobble signal other than the synchronous code; and an address composition unit outputting the physical address of the optical recording medium by combining the detected sector-by-sector address information with the detected address information of the error correction code block.

3. The device as set forth in claim 2, wherein the synchronous signal detecting unit includes:

first synchronous detecting unit detecting a synchronous code indicating a head of a first sector in the error correction code block, from the wobble signal read from the optical recording medium;

second synchronous detecting unit detecting a different synchronous code indicating the head of each of the remaining sectors other than the first sector; and a counter outputting, as a synchronous code value, a count value obtained by counting said different kind of synchronous codes detected by the second synchronous detecting unit, on the basis of the synchronous code detected by the first synchronous detecting unit.

* * * * *